United States Patent
Boek et al.

(10) Patent No.: US 11,597,676 B2
(45) Date of Patent: Mar. 7, 2023

(54) GLASS-CERAMIC COMPOSITIONS AND LAMINATED GLASS ARTICLES INCORPORATING THE SAME

(71) Applicant: CORNING INCORPORATED, Corning, NY (US)

(72) Inventors: Heather Debra Boek, Corning, NY (US); Natesan Venkataraman, Painted Post, NY (US); Mark Owen Weller, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/929,319

(22) Filed: Jul. 15, 2020

(65) Prior Publication Data
US 2020/0346968 A1 Nov. 5, 2020

Related U.S. Application Data (62) Division of application No. 15/521,707, filed as application No. PCT/US2015/057928 on Oct. 29, 2015, now Pat. No. 10,752,536.
(Continued)

(51) Int. Cl.
*B32B 15/04* (2006.01)
*B32B 17/06* (2006.01)
(Continued)

(52) U.S. Cl.
CPC .......... *C03C 10/0027* (2013.01); *B32B 7/027* (2019.01); *B32B 17/00* (2013.01);
(Continued)

(58) Field of Classification Search
CPC ....................................... B32B 17/06
(Continued)

(56) References Cited

U.S. PATENT DOCUMENTS 3,282,770 A 11/1966 Stookey et al.
3,489,097 A 1/1970 William
(Continued)

FOREIGN PATENT DOCUMENTS

CN 1391537 A 1/2003
EP 1125901 A1 8/2001
(Continued)

OTHER PUBLICATIONS

Chinese Patent Application No. 201580067921.2 Decision on Rejection dated Oct. 10, 2020; 18 pages; English Translation Only) Chinese Patent Office.
(Continued)

*Primary Examiner* — Lauren R Colgan
(74) *Attorney, Agent, or Firm* — Daniel J. Greenhalgh (57) ABSTRACT

According to one embodiment, a glass-ceramic composition may include from about 60 mol. % to about 75 mol. % $SiO_2$; from about 5 mol. % to about 10 mol. % $Al_2O_3$; from about 2 mol. % to about 20 mol. % alkali oxide $R_2O$, the alkali oxide $R_2O$ including $Li_2O$ and $Na_2O$; and from 0 mol. % to about 5 mol. % alkaline earth oxide RO, the alkaline earth oxide RO including MgO. A ratio of $Al_2O_3$ (mol. %) to the sum of ($R_2O$ (mol. %)+RO (mol. %)) may be less than 1 in the glass-ceramic composition. A major crystalline phase of the glass-ceramic composition may be $Li_2Si_2O_5$. A liquidus viscosity of the glass-ceramic composition may be greater than 35 kP. The glass-ceramic composition may be used to form the glass clad layer(s) of a laminated glass article.

17 Claims, 1 Drawing Sheet

Related U.S. Application Data (60) Provisional application No. 62/072,673, filed on Oct. 30, 2014.

(51) Int. Cl.
*C03C 10/00* (2006.01)
*C03C 3/083* (2006.01)
*C03C 3/097* (2006.01)
*B32B 7/027* (2019.01)
*B32B 17/00* (2006.01)
*C03B 32/02* (2006.01)
*C03B 17/06* (2006.01)

(52) U.S. Cl.
CPC .............. *B32B 17/06* (2013.01); *C03B 32/02* (2013.01); *C03C 3/083* (2013.01); *C03C 3/097* (2013.01); *B32B 2307/30* (2013.01); *C03B 17/064* (2013.01); *C03C 2204/00* (2013.01)

(58) Field of Classification Search
USPC .................................. 428/426, 432, 410, 428
See application file for complete search history.

(56) References Cited

U.S. PATENT DOCUMENTS

| | | | |
|---|---|---|---|
| 3,498,775 A | 3/1970 | Simmons | |
| 3,597,305 A | 8/1971 | Giffen | |
| 3,637,453 A | 1/1972 | Simmons | |
| 3,673,049 A | 6/1972 | Giffen et al. | |
| 3,849,097 A | 11/1974 | Giffen et al. | |
| 3,931,438 A | 1/1976 | Beall et al. | |
| 4,023,953 A | 5/1977 | Megles et al. | |
| 4,093,468 A | 6/1978 | Boitel et al. | |
| 4,130,680 A | 12/1978 | Ference et al. | |
| 4,212,678 A | 7/1980 | Chyung et al. | |
| 4,214,886 A | 7/1980 | Shay et al. | |
| 4,405,672 A | 9/1983 | Araujo et al. | |
| 4,455,160 A | 6/1984 | Rittler | |
| 4,473,653 A * | 9/1984 | Rudoi | C03C 10/0027 2/2.5 |
| 4,480,044 A | 10/1984 | McAlinn | |
| 5,212,122 A | 5/1993 | Pannhorst et al. | |
| 5,336,643 A | 8/1994 | Goto et al. | |
| 5,411,563 A | 5/1995 | Yeh et al. | |
| 5,591,682 A | 1/1997 | Goto | |
| 6,455,451 B1 | 9/2002 | Brodkin et al. | |
| 6,515,263 B2 | 2/2003 | Mitra et al. | |
| 6,819,526 B2 | 11/2004 | Kataoka et al. | |
| 7,465,686 B2 | 12/2008 | Comte | |
| 2001/0051583 A1 | 12/2001 | Nagata et al. | |
| 2002/0010063 A1 | 1/2002 | Schweiger et al. | |
| 2002/0035025 A1 | 3/2002 | Schweiger et al. | |
| 2002/0193233 A1 | 12/2002 | Kishimoto et al. | |
| 2003/0073563 A1 | 4/2003 | Brodkin et al. | |
| 2003/0099062 A1 | 5/2003 | Kataoka et al. | |
| 2004/0197575 A1 | 10/2004 | Bocko et al. | |
| 2006/0127679 A1 | 6/2006 | Gulati et al. | |
| 2006/0171033 A1 * | 8/2006 | Schreder | B29D 11/00 359/566 |
| 2009/0062102 A1 * | 3/2009 | Borrelli | C03C 3/085 501/64 |
| 2009/0118113 A1 | 5/2009 | Yagi | |
| 2009/0162608 A1 * | 6/2009 | Yagi | C03C 10/0009 428/141 |
| 2010/0304948 A1 | 12/2010 | Comte et al. | |
| 2011/0217657 A1 | 9/2011 | Flemming et al. | |
| 2012/0135848 A1 | 5/2012 | Beall et al. | |
| 2014/0243183 A1 * | 8/2014 | Beall | C03C 3/097 501/32 |
| 2015/0232380 A1 | 8/2015 | Bookbinder et al. | |
| 2015/0239772 A1 | 8/2015 | Baker et al. | |
| 2015/0251383 A1 | 9/2015 | Beall et al. | |
| 2015/0251949 A1 | 9/2015 | Boek et al. | |
| 2015/0291468 A1 * | 10/2015 | Boek | C03C 21/002 428/410 |
| 2016/0031187 A1 | 2/2016 | Zhang et al. | |

FOREIGN PATENT DOCUMENTS

| | | |
|---|---|---|
| GB | 2315266 A | 1/1998 |
| JP | 2000-178036 A | 6/2000 |
| JP | 2001-184624 A | 7/2001 |
| WO | 2008/150355 A1 | 12/2008 |
| WO | 2014/055834 A1 | 4/2014 |
| WO | 2014/055837 A2 | 4/2014 |
| WO | 2014/055840 A2 | 4/2014 |

OTHER PUBLICATIONS

English Translation of CN201580067921.2 Office Action dated Apr. 15, 2019; 12 Pages; Chinese Patent Office.
International Search Report and Written Opinion of the International Searching Authority; PCT/US15/57928; dated Jan. 26, 2016; 11 Pages; European Patent Office.
Japanese Patent Application No. 2017-522953 Reconsideration Report by Examiner before Appeal dated Oct. 27, 2020; 6 Pages; (3 pages of English Translation and 3 pages of Original Document).
N. Monmaturapoj et al. "Characterisation and Properties of Lithium Disilicate Glass Ceramics in the SiO2—Li2O—K2O—Al2O3 System for Dental Applications", Advances in Materials Science and Engineering, vol. 2013, pp. 1-11, 2013.

* cited by examiner

GLASS-CERAMIC COMPOSITIONS AND LAMINATED GLASS ARTICLES INCORPORATING THE SAME

This application is a divisional of U.S. patent application Ser. No. 15/521,707 filed on Oct. 29, 2015, which claims the benefit of priority under 35 U.S.C. § 371 of International Application No. PCT/US15/57928, filed on Oct. 29, 2015, which claims the benefit of priority under 35 U.S.C. § 119 of U.S. Provisional Application No. 62/072,673, filed on Oct. 30, 2014, the content of each of which is relied upon and incorporated herein by reference in its entirety, and the benefit of priority under 35 U.S.C § 120 is hereby claimed.

BACKGROUND

Field

The present specification generally relates to glass-ceramic compositions and to laminated glass articles incorporating glass-ceramic compositions.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

SUMMARY

According to one embodiment, a glass-ceramic composition may include from about 60 mol. % to about 75 mol. % $SiO_2$; from about 5 mol. % to about 10 mol. % $Al_2O_3$; from about 2 mol. % to about 20 mol. % alkali oxide $R_2O$, the alkali oxide $R_2O$ comprising $Li_2O$ and $Na_2O$; and from about 0 mol. % to about 5 mol. % alkaline earth oxide RO, the alkaline earth oxide RO comprising MgO. A ratio of $Al_2O_3$ (mol. %) to the sum of ($R_2O$ (mol. %)+RO (mol. %)) may be less than 1 in the glass-ceramic composition. A major crystalline phase of the glass-ceramic composition may be $Li_2Si_2O_5$. A liquidus viscosity of the glass-ceramic composition may be greater than 35 kP.

In another embodiment, a laminated glass article may include a glass core layer having a core coefficient of thermal expansion $CTE_C$. At least one glass clad layer may be directly fused to the glass core layer. The at least one glass clad layer may include from about 60 mol. % to about 75 mol. % $SiO_2$; from about 5 mol. % to about 10 mol. % $Al_2O_3$; from about 2 mol. % to about 20 mol. % alkali oxide $R_2O$, the alkali oxide $R_2O$ comprising $Li_2O$ and $Na_2O$; from about 0 mol. % to about 5 mol. % alkaline earth oxide RO, the alkaline earth oxide RO comprising MgO. A ratio of $Al_2O_3$ (mol. %) to the sum of ($R_2O$ (mol. %)+RO (mol. %)) in the glass clad layer may be less than 1. A major crystalline phase of the at least one glass clad layer may be $Li_2Si_2O_5$. The at least one glass clad layer may have a clad coefficient of thermal expansion $CTE_{CL}$ that is greater than or equal to $20 \times 10^{-7}/°$ C. and less than or equal to about $70 \times 10^{-7}/°$ C. and less than the core coefficient of thermal expansion $CTE_C$.

Additional features and advantages of the glass-ceramic compositions described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of glass-ceramic compositions and laminated glass articles formed therefrom. Whenever possible, the same reference numerals will be used throughout the drawings to refer to the same or like parts. According to one embodiment a glass-ceramic composition may include may include from about 60 mol. % to about 75 mol. % $SiO_2$; from about 5 mol. % to about 10 mol. % $Al_2O_3$; from about 2 mol. % to about 20 mol. % alkali oxide $R_2O$, the alkali oxide $R_2O$ comprising $Li_2O$ and $Na_2O$; and from about 0 mol. % to about 5 mol. % alkaline earth oxide RO, the alkaline earth oxide RO comprising MgO. A ratio of $Al_2O_3$ (mol. %) to the sum of ($R_2O$ (mol. %)+RO (mol. %)) may be less than 1 in the glass-ceramic composition. A major crystalline phase of the glass-ceramic composition may be $Li_2Si_2O_5$. A liquidus viscosity of the glass-ceramic composition may be greater than 35 kP. Various embodiments of glass-ceramic compositions and laminated glass articles incorporating the same will be described in further detail herein with specific reference to the appended drawings.

The term "liquidus viscosity," as used herein, refers to the shear viscosity of the glass-ceramic composition at its liquidus temperature.

The term "CTE," as used herein, refers to the coefficient of thermal expansion of a glass or glass-ceramic composition averaged over a temperature range from about 20° C. to about 300° C.

The term "substantially free," when used to described the absence of a particular oxide component in a glass or glass-ceramic composition, means that the component is present in the glass or glass-ceramic composition as a contaminant in a trace amount of less than 0.1 mol. %.

In the embodiments of the glass-ceramic compositions described herein, the concentration of constituent components (e.g., $SiO_2$, $Al_2O_3$, $Na_2O$ and the like) are given in mole percent (mol. %) on an oxide basis, unless otherwise specified.

The glass-ceramic compositions described herein have properties, such as the liquidus viscosity, which make the glass-ceramic compositions particularly well suited for use with fusion forming processes, such as the fusion down draw process and/or the fusion lamination process. These properties are attributable to the specific compositions of the glasses.

As will be described in further detail herein, laminated glass articles may be formed by fusing one or more glass clad layers to a glass core layer. When strengthening of the laminated glass article is desired, the glass clad layer(s) and the glass core layer may have different coefficients of thermal expansion (CTE) such that, upon cooling, compressive stress develops in the glass clad layers(s).

Various processes may be utilized to produce laminated glass articles, including the fusion lamination process which yields a continuous ribbon of laminated glass. Discrete laminated glass articles may be singulated from the continuous ribbon of laminated glass for incorporation in other devices. If the compressive stress develops in the clad glass layer(s) of the continuous ribbon of laminated glass prior to singulation, the singulation process may be difficult due to the increased strength of the laminated glass from the presence of the compressive stress, potentially resulting in unwanted damage to the continuous ribbon of laminated glass and/or the discrete laminated glass articles.

However, the timing of the development of the compressive stress can be controlled by utilizing glass-ceramic compositions to form at least the clad glass layers. Glass-ceramic compositions may have a first coefficient of thermal expansion pre-ceramming ($CTE_{PC}$) and a second coefficient of thermal expansion after ceramming ($CTE_{AC}$) which allows the timing of the introduction of compressive stress to be controlled based on the ceramming process. For example, the glass clad layers may be formed from a glass-ceramic composition which has a pre-ceramming $CTE_{PC}$ that is approximately the same as the coefficient of thermal expansion of the glass core layer such that the ribbon of laminated glass may be initially formed without introducing compressive stress in the glass clad layer(s) due to the coefficient of thermal expansion mismatch between the glass clad layers(s) and the glass core layer. This allows for the discrete laminated glass articles to be readily singulated from the continuous ribbon of laminated glass without damaging either the ribbon or the discrete laminated glass articles. Thereafter, the discrete laminated glass articles may be cerammed (i.e., heat treated) to form a ceramic crystal phase in the glass clad layers, thereby lowering the coefficient of thermal expansion of the glass clad layers to $CTE_{AC}$ which, in turn, causes compressive stress to develop in the surface of the glass clad layers. The glass-ceramic compositions described herein have a pre-ceramming $CTE_{PC}$ which is greater than the post ceramming $CTE_{AC}$ and, as such are well suited for use as a glass clad layer of a strengthened laminated glass article.

In the embodiments of the glass-ceramic compositions described herein $SiO_2$ is the largest constituent of the composition and, as such, $SiO_2$ is the primary constituent of the glass network formed from the glass-ceramic compositions. Pure $SiO_2$ has a relatively low CTE. However, pure $SiO_2$ has an extremely high melting point. Accordingly, if the concentration of $SiO_2$ in the glass-ceramic compositions described herein is too high, the formability of the glass-ceramic composition may be diminished as higher concentrations of $SiO_2$ increase the difficulty of melting the glass which, in turn, adversely impacts the formability of the glass.

In the embodiments described herein, the glass-ceramic compositions generally comprise $SiO_2$ in a concentration greater than or equal to about 60 mol. % and less than or equal to about 75 mol. % in order to facilitate fusion forming the glass-ceramic compositions. In some embodiments, the concentration of $SiO_2$ in the glass-ceramic composition is greater than or equal to about 68 mol. % and less than or equal to about 75 mol. %. In still other embodiments, the amount of $SiO_2$ in the glass-ceramic composition is greater than or equal to about 70 mol. % and less than or equal to about 74 mol. %. In some other embodiments, the glass-ceramic composition comprises $SiO_2$ in a concentration from about 71 mol. % to about 73 mol. %.

The glass-ceramic compositions described herein also comprise $Al_2O_3$. $Al_2O_3$ serves as a glass network former, similar to $SiO_2$. Like $SiO_2$, $Al_2O_3$ increases the viscosity of the glass-ceramic composition due to its tetrahedral coordination in a glass melt formed from the glass-ceramic composition. However, when the concentration of $Al_2O_3$ is balanced against the concentration of $SiO_2$ and the concentration of alkali and alkaline earth oxides in the glass-ceramic composition, $Al_2O_3$ can reduce the liquidus temperature of the glass melt, thereby enhancing the liquidus viscosity and improving the compatibility of the glass-ceramic composition with certain forming processes such as the fusion forming process.

In the embodiments described herein, the concentration of $Al_2O_3$ in the glass-ceramic compositions is greater than or equal to about 5 mol. % and less than or equal to about 12 mol. %. In some embodiments, the concentration of $Al_2O_3$ in the glass-ceramic compositions may be greater than or equal to about 5 mol. % and less than or equal to about 10 mol. %. In some other embodiments, the concentration of $Al_2O_3$ in the glass-ceramic compositions may be greater than or equal to about 6 mol. % and less than or equal to about 10 mol. %. In some other embodiments, the concentration of $Al_2O_3$ in the glass ceramic compositions may be greater than or equal to about 7 mol. % and less than or equal to about 10 mol. %.

The glass-ceramic compositions described herein also include alkali oxide $R_2O$ where R is at least one of a Group I metal including, without limitation, Li, Na, K, Rb, Cs, or combinations thereof. In the embodiments described herein the alkali oxide lowers the melting temperature and the liquidus temperature of the glass, thereby improving the formability of the glass-ceramic compositions. However, relative to other oxides included in the glass, alkali oxides increase the CTE of the glass-ceramic compositions while simultaneously improving the ion-exchange performance. In general, the substitution of $K_2O$ for $Na_2O$ generally increases the CTE of the glass while the substitution of $Li_2O$ for $Na_2O$ decreases the CTE. Accordingly, the presence of smaller alkali ions in the glass causes a smaller increase in the CTE.

Additions of alkali oxide $R_2O$ also facilitate ion-exchange strengthening the glass-ceramic compositions due to their relatively high mobility in the glass. For example, smaller ions in a glass article formed from the glass-ceramic composition, such as $Li^+$ ions and $Na^+$ ions, may be exchanged for larger ions, such as $K^+$ ions, in a molten salt bath, thereby creating compressive stress in the surface of the glass article formed from the glass-ceramic composition.

Further, the addition of the specific alkali oxide $Li_2O$ to the glass-ceramic compositions facilitates the formation of $Li_2Si_2O_5$ (lithium disilicate) in the glass network upon ceramming (i.e., upon heat treatment) after initial formation. $Li_2Si_2O_5$ is the primary crystal phase of the glass-ceramic compositions described herein. The formation of $Li_2Si_2O_5$ in the glass-ceramic compositions lowers the coefficient of thermal expansion of the as-formed glass-ceramic compositions, making the glass-ceramic compositions particularly useful as the clad glass layers of a laminated glass article when strengthening is desired.

In the embodiments described herein, the alkali oxide $R_2O$ includes at least one of $Li_2O$ or $Na_2O$ and, in some embodiments, may include $K_2O$. In the embodiments described herein, $Na_2O$ may be present in the glass-ceramic compositions in a concentration greater than or equal to about 1 mol. % and less than or equal to about 10 mol. % or even a concentration greater than or equal to about 2 mol. % and less than or equal to about 9 mol. %. In some embodiments, $Na_2O$ may be present in the glass-ceramic compositions in a concentration greater than or equal to about 3 mol. % and less than or equal to about 9 mol. % or even a concentration greater than or equal to about 4 mol. % and less than or equal to about 8 mol. %. In some embodiments, $Na_2O$ may be present in the glass-ceramic compositions in a concentration greater than or equal to about 5 mol. % and less than or equal to about 8 mol. %.

$Li_2O$ may be present in the glass-ceramic compositions in a concentration greater than or equal to about 1 mol. % and less than or equal to about 10 mol. % or even a concentration greater than or equal to about 2 mol. % and less than or equal to about 8 mol. %. In some embodiments, $Li_2O$ may be present in the glass-ceramic compositions in a concentration greater than or equal to about 3 mol. % and less than or equal to about 7 mol. % or even a concentration greater than or equal to about 4 mol. % and less than or equal to about 6 mol. %.

$K_2O$ may be present in the glass-ceramic compositions in a concentration greater than or equal to about 0 mol. % and less than or equal to about 10 mol. % or even a concentration greater than or equal to about 0.5 mol. % and less than or equal to about 8 mol. %. In some embodiments, $K_2O$ may be present in the glass-ceramic compositions in a concentration greater than or equal to about 1 mol. % and less than or equal to about 7 mol. % or even a concentration greater than or equal to about 1 mol. % and less than or equal to about 5 mol. %. In some other embodiments, $K_2O$ may be present in the glass-ceramic compositions in a concentration greater than or equal to about 2 mol. % and less than or equal to about 4 mol. %. In still other embodiments, the glass-ceramic compositions may be substantially free of $K_2O$.

In some embodiments, the glass-ceramic compositions described herein may further include alkaline earth oxide RO, where R is an alkaline earth metal including, without limitation one or more of Mg, Ca, Ba, and Sr. The alkaline earth oxide RO improves the melting behavior of the glass-ceramic compositions but may also increase the average coefficient of thermal expansion of the compositions. While, the alkaline earth oxides do not increase the average coefficient of thermal expansion of the glass-ceramic compositions as much as the alkali oxides contained in the glass-ceramic compositions, they do decrease the mobility of alkali ions in the glass thereby decreasing the ion-exchangeability of the glass-ceramic compositions. Accordingly, in the embodiments described herein, additions of the alkaline earth oxide RO are limited. Indeed, in some embodiments, the glass-ceramic compositions are substantially free of alkaline earth oxides while in others the total concentration of alkaline earth oxides is less than or equal to about 5 mol. %. That is, in the embodiments described herein, the concentration of alkaline earth oxides in the glass-ceramic compositions may be greater than or equal to 0 mol. % and less than or equal to about 5 mol. %.

It has been found that the specific alkaline earth oxide MgO minimizes the adverse impact on alkali diffusivity and, as such, only minimally decreases the ion-exchange performance of the glass-ceramic compositions. Moreover, MgO does not increase the average CTE of the glass-ceramic compositions as much as other alkaline earth oxides such as, for example, CaO and BaO. Accordingly, in some embodiments of the glass-ceramic compositions which include alkaline earth oxide RO, the alkaline earth oxide comprises MgO. In these embodiments, MgO may be present in the glass-ceramic compositions in an amount which is greater than or equal to 0 mol. % and less than or equal to about 5 mol. %. In some of these embodiments, MgO may be present in the glass-ceramic compositions in an amount which is less than or equal to about 4 mol. % such as less than or equal to about 3 mol. % or even less than or equal to about 2 mol. %.

In some embodiments, the glass-ceramic compositions may be substantially free of alkaline earth oxides RO.

In some embodiments, $TiO_2$ may be included in the glass-ceramic compositions. Additions of $TiO_2$ act as a nucleating agent and aid in the formation of the $Li_2Si_2O_5$ primary crystal phase upon ceramming. Further, additions of $TiO_2$ to the glass-ceramic compositions also results in the nucleation and formation of a secondary crystal phase upon ceramming, specifically rutile ($TiO_2$). In the embodiments described herein, $TiO_2$ is present in the glass-ceramic compositions in a concentration greater than or equal to 0 mol. % and less than or equal to 4 mol. %. In some embodiments, the concentration of $TiO_2$ in the glass-ceramic compositions may be greater than or equal to 1 mol. % and less than or equal to 4 mol. %. In some embodiments, the concentration of $TiO_2$ in the glass-ceramic compositions may be greater than or equal to 1 mol. % and less than or equal to 3 mol. %. In some other embodiments, the concentration of $TiO_2$ in the glass-ceramic compositions may be greater than or equal to 2 mol. % and less than or equal to 3 mol. %.

In some embodiments, $ZrO_2$ may be included in the glass-ceramic compositions. Like $TiO_2$, $ZrO_2$ acts as a nucleating agent and aids in the formation of the $Li_2Si_2O_5$ primary crystal phase upon ceramming. In the embodiments described herein, $ZrO_2$ is present in the glass-ceramic compositions in a concentration greater than or equal to 0 mol. % and less than or equal to 4 mol. %. In some embodiments, the concentration of $ZrO_2$ in the glass-ceramic compositions may be greater than or equal to 1 mol. % and less than or equal to 3 mol. %. In some other embodiments, the concentration of $ZrO_2$ in the glass-ceramic compositions may be greater than or equal to 2 mol. % and less than or equal to 3 mol. %.

Optionally, the glass-ceramic compositions may further include $P_2O_5$. Like $TiO_2$ and $ZrO_2$, $P_2O_5$ acts as a nucleating agent and aids in the formation of the $Li_2Si_2O_5$ primary crystal phase upon ceramming. In embodiments where the glass-ceramic compositions contain $P_2O_5$, $P_2O_5$ may be present in the glass-ceramic compositions in a concentration of greater than or equal to 0 mol. % and less than or equal to 3 mol. %. In some embodiments, $P_2O_5$ may be present in the glass-ceramic compositions in a concentration greater than or equal to 0.5 mol. % and less than or equal to 1.5 mol. %.

In the embodiments of the glass-ceramic compositions described herein, a single nucleating agent may be included in the composition (i.e., one of $TiO_2$, $ZrO_2$, $P_2O_5$) or a combination of two or more nucleating agents (i.e., a combination of two or more of $TiO_2$, $ZrO_2$, $P_2O_5$).

The glass-ceramic compositions described herein may optionally include one or more fining agents. The fining agents may include, for example, $SnO_2$. The fining agents may be present in the glass-ceramic compositions in an amount greater than or equal to about 0 mol. % and less than or equal to about 1.0 mol. %. In exemplary embodiments, the fining agent is $SnO_2$. $SnO_2$ may be present in the glass-ceramic compositions in a concentration greater than or equal to about 0 mol. % and less than or equal to about 0.5 mol. %.

In some embodiments described herein, the glass-ceramic compositions are substantially free of heavy metals and compounds containing heavy metals. The term "heavy metals," as used herein, refers to Ba, As, Sb, Cd, and Pb.

In the embodiments of the glass-ceramic compositions described herein, a ratio of the concentration of $Al_2O_3$ (mol. %) to the sum of the concentration of alkali oxide $R_2O$ (mol. %) and alkaline earth oxides (mol. %) (i.e., $Al_2O_3$ (mol. %)/($R_2O$ (mol. %)+RO (mol. %)) is less than 1. For example, in some embodiments, $Al_2O_3$ (mol. %)/($R_2O$ (mol. %)+RO (mol. %)) may be less than 1 and greater than or equal to 0.5. In some of these embodiments $Al_2O_3$ (mol. %)/($R_2O$ (mol. %)+RO (mol. %)) may be less than or equal to 0.9, such as less than or equal to 0.8. In some other embodiments $Al_2O_3$ (mol. %)/($R_2O$ (mol. %)+RO (mol. %)) may be greater than or equal to 0.5 and less than or equal to 0.75, such as less than or equal to 0.7. It is hypothesized that maintaining the concentrations of constituent components in the glass-ceramic compositions such that the ratio of $Al_2O_3$ (mol. %)/($R_2O$ (mol. %)+RO (mol. %) is less than 1 and greater than or equal to 0.5 assists in maintaining the liquidus temperatures and liquidus viscosities within ranges suitable for fusion forming.

In some embodiments of the glass-ceramic compositions described herein the ratio of $SiO_2$ (mol. %) to $Al_2O_3$ (mol. %) is greater than 7, such as greater than 7 and less than or equal to 10. In some of these embodiments, the ratio of $SiO_2$ (mol. %) to $Al_2O_3$ (mol. %) is greater than 7.1 or even greater than 7.2. In some other embodiments, the ratio of $SiO_2$ (mol. %) to $Al_2O_3$ (mol. %) is greater than 7.3.

In some embodiments of the glass-ceramic compositions described herein, the ratio of the sum of the concentration of $Li_2O$ (mol. %) and twice the concentration of $SiO_2$ (mol. %) to the concentration of $Al_2O_3$ (mol. %) (i.e., ($Li_2O$ (mol. %)+2*$SiO_2$ (mol. %))/$Al_2O_3$ (mol. %)) is greater than 13, such as greater than 13 and less than or equal to 22. In some of these embodiments, the ratio ($Li_2O$ (mol. %)+2*$SiO_2$ (mol. %))/$Al_2O_3$ (mol. %) is greater than 14 or even greater than 15, and less than or equal to 22. It is hypothesized that maintaining the concentrations of constituent components in the glass-ceramic compositions such that the ratio ($Li_2O$ (mol. %)+2*$SiO_2$ (mol. %))/$Al_2O_3$ (mol. %) is greater than 13 assists in the formation of the primary crystal phase $Li_2Si_2O_5$. However, if the concentration of $Al_2O_3$ is too high (i.e., the ratio of ($Li_2O$ (mol. %)+2*$SiO_2$ (mol. %))/$Al_2O_3$ (mol. %)) is too low), less of the primary crystal phase $Li_2Si_2O_5$ will form and, instead, less desirable phases will form, such as solid solutions of eucryptite, stuffed beta-quartz, and/or $LiAlSiO_4$.

In some embodiments of the glass-ceramic compositions described herein, the ratio of the sum of the concentration of alkali oxide $R_2O$ (mol. %) and twice the concentration $SiO_2$ (mol. %) to the concentration of $Al_2O_3$ (mol. %) (i.e., ($R_2O$ (mol. %)+2*$SiO_2$ (mol. %))/$Al_2O_3$ (mol. %)) is greater than 8.5. For example, in some embodiments, the ratio ($R_2O$ (mol. %)+2*$SiO_2$ (mol. %))/$Al_2O_3$ (mol. %) is greater than 8.5 and less than or equal to 9.5. It is hypothesized that maintaining the concentrations of constituent components in the glass-ceramic compositions such that the ratio ($R_2O$ (mol. %)+2*$SiO_2$ (mol. %))/$Al_2O_3$ (mol. %) is greater than 8.5 assists in the formation of the primary crystal phase $Li_2Si_2O_5$, as described above with the respect to the ratio of ($Li_2O$ (mol. %)+2*$SiO_2$ (mol. %))/$Al_2O_3$ (mol. %)). However, it has been found that when the concentrations of $Na_2O$ and $K_2O$ increase relative to $Al_2O_3$, more $Li_2Si_2O_5$ is produced and the coefficient of thermal expansion of the glass decreases for a given ceramming schedule.

In some embodiments of the glass-ceramic compositions described herein, the ratio of the sum of the concentration of $SiO_2$ (mol. %), the concentration of $Al_2O_3$ (mol. %), the concentration of $Li_2O$ (mol. %), the concentration of $K_2O$ (mol. %), and $Na_2O$ (mol. %) to the sum of the concentration of the nucleating agents (i.e., ($SiO_2$ (mol. %)+$Al_2O_3$ (mol. %)+$Li_2O$ (mol. %)+$K_2O$ (mol. %)+$Na_2O$ (mol. %))/($TiO_2$ (mol. %)+$P_2O_5$ (mol. %)+$ZrO_2$ (mol. %)) is greater than 26, such as greater than 26 and less than or equal to about 31. In some of these embodiments, the ratio may be greater than or equal to about 27, greater than or equal to about 28, or even greater than or equal to about 29. It is hypothesized that maintaining the ratio of ($SiO_2$ (mol. %)+$Al_2O_3$ (mol. %)+$Li_2O$ (mol. %)+$K_2O$ (mol. %)+$Na_2O$ (mol. %))/($TiO_2$ (mol. %)+$P_2O_5$ (mol. %)+$ZrO_2$ (mol. %)) to greater than 26 improves the nucleation of $Li_2Si_2O_5$. That is, $TiO_2$, $ZrO_2$, and $P_2O_5$ each act as nucleating agents. If the concentration of nucleating agents is too high, less desirable phases will nucleate in the glass, such a rutile and zircon. However, if the concentration of nucleating agents is too low, the glass does not crystallize.

The glass-ceramic compositions described herein have liquidus viscosities suitable for fusion formation, such as by the fusion down-draw process and/or the fusion lamination process. In particular, the glass-ceramic compositions described herein have liquidus viscosities greater than or equal to about 35,000 Poise (35 kPoise). In some embodiments, the liquidus viscosity is greater than or equal to 50 kPoise or even greater than or equal to 100 kPoise.

The glass-ceramic compositions described herein generally have a pre-ceramming average coefficient of thermal expansion $CTE_{PC}$ (i.e., the CTE prior to any treatments which result in the nucleation of ceramic phases in the glass) which is greater than or equal to $65 \times 10^{-7}/°$ C. and less than or equal to about $110 \times 10^{-7}/°$ C. in a range from 20° C. to 300° C. In some embodiments, the glass-ceramic compositions described herein have a post-ceramming $CTE_{AC}$ of greater than or equal to about $20 \times 10^{-7}/°$ C. and less than or equal to about $70 \times 10^{-7}/°$ C. in a range from 20° C. to 300° C. In yet other embodiments, the post-ceramming $CTE_{AC}$ of the glass-ceramic compositions may be greater than or equal to about $30 \times 10^{-7}/°$ C. and less than or equal to about $70 \times 10^{-7}/°$ C. in a range from 20° C. to 300° C.

As noted hereinabove, the glass-ceramic compositions disclosed herein may be treated after formation to induce the nucleation and growth of ceramic phases which, in turn, decreases the coefficient of thermal expansion of the as-formed glass-ceramic. In the embodiments described herein, the treatment to induce the nucleation and growth of ceramic phases in the glass-ceramic composition is a two-part process which includes heating to a nucleation temperature and holding the glass-ceramic composition at this nucleation temperature for a nucleation hold time to begin nucleation of the ceramic phase(s). The second part of the two-part process includes further heating the glass-ceramic composition to a crystallization temperature and holding the glass-ceramic composition at this temperature for a crystallization hold time to allow the nucleated ceramic phases(s) to crystallize and grow. In the embodiments described herein, the nucleation temperature may be from about 700° C. to about 750° C. and the nucleation time may be from about 1 hour to about 2 hours. In the embodiments described herein, the crystallization temperature may be from about 750° C. to about 900° C. and the crystallization hold time may be from about 2 hours to about 24 hours. However, it has now been found that crystallization hold times of greater than 4 hours (e.g., greater than or equal to 6 hours, greater than or equal to 8 hours, greater than or equal to 10 hours, greater than or equal to 12 hours, greater than or equal to 14 hours, greater than or equal to 16 hours, greater than or equal to 18 hours, greater than or equal to 20 hours, greater than or equal to 22 hours, or even greater than or equal to or equal to 24 hours) results in a fewer number of ceramic crystals, each of which are of larger size, than the ceramic crystals produced at crystallization hold times of less than or equal to 4 hours, despite having the same number of nucleants at the beginning of the crystallization phase. These longer crystallization hold times also result in a corresponding decrease in the post-ceramming $CTE_{AC}$. Accordingly, in some embodiments described herein, the glass-ceramic compositions are heat treated at the crystallization temperature for crystallization hold times of greater than 4 hours.

Figure 1:
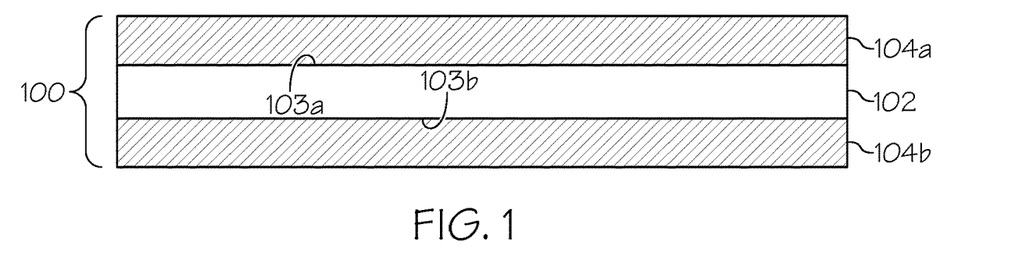
FIG. 1 schematically depicts a cross section of a laminated glass article according to one or more embodiments shown and described herein.

Referring now to FIG. 1, in some embodiments, the glass-ceramic compositions described herein may be used to form the glass clad layers of a laminated glass article, such as the laminated glass article 100 schematically depicted in cross section in FIG. 1. The laminated glass article 100 generally comprises a glass core layer 102 and at least one glass clad layer 104a. In the embodiment of the laminated glass article 100 shown in FIG. 1 the laminated glass article includes a first glass clad layer 104a and a second glass clad layer 104b positioned on opposite sides of the glass core layer 102. While FIG. 1 schematically depicts the laminated glass article 100 as being a laminated glass sheet, it should be understood that other configurations and form factors are contemplated and possible. For example, the laminated glass article may have a non-planar configuration such as a curved glass sheet or the like. Alternatively, the laminated glass article may be a laminated glass tube, container, or the like.

In the embodiment of the laminated glass article 100 depicted in FIG. 1, the glass core layer 102 generally comprises a first surface 103a and a second surface 103b which is opposed to the first surface 103a. A first glass clad layer 104a is fused to the first surface 103a of the glass core layer 102 and a second glass clad layer 104b is fused to the second surface 103b of the glass core layer 102. The glass clad layers 104a, 104b are fused to the glass core layer 102 without any additional non-glass materials, such as adhesives, coating layers or the like, being disposed between the glass core layer 102 and the glass clad layers 104a, 104b. Thus, in some embodiments, the glass clad layers 104a, 104b are fused directly to the glass core layer 102 or are directly adjacent to the glass core layer. In some embodiments, the laminated glass article 100 comprises one or more intermediate layers disposed between the glass core layer and the glass clad layer(s). For example, the intermediate layers may comprise intermediate glass layers and/or diffusion layers formed at the interface of the glass core layer and the glass clad layer(s) (e.g., by diffusion of one or more components of the glass core and glass clad layers into the diffusion layer). In some embodiments, the laminated glass article comprises a glass-glass laminate (e.g., an in situ fused multilayer glass-glass laminate) in which the interfaces between directly adjacent glass layers are glass-glass interfaces.

In the embodiments of the laminated glass articles described herein, the glass-ceramic composition of the glass clad layers 104a, 104b initially produces a CTE match between the glass core layer 102 and the glass clad layers 104a, 104b resulting in the formation of little, if any, compressive stress in the glass clad layers 104a, 104b. For example, the pre-ceramming $CTE_{PC}$ of the glass clad layers 104a, 104b is within about 20%, within about 15%, within about 10%, within about 5%, within about 2%, or within about 1% of the coefficient of thermal expansion of the glass core layer 102. However, after formation, the laminated glass article may be further heat treated to ceram the glass clad layers, thereby creating a CTE mismatch between the glass core layer 102 and the glass clad layers 104a, 104b. For example, in the embodiments described herein, the glass clad layers 104a, 104b are formed from the glass-ceramic compositions described hereinabove which can be heat treated after formation of the laminated glass article such that the average clad coefficient of thermal expansion $CTE_{CL}$ of the glass clad layers 104a, 104b is the glass-ceramic coefficient of expansion $CTE_{AC}$ which is less than the average core coefficient of thermal expansion $CTE_C$ of the glass core layer 102. This differential in the coefficients of thermal expansion following heat treatment results in the glass clad layers 104a, 104b being compressively stressed without being ion-exchanged or thermally tempered.

For example, in some embodiments, the average core $CTE_C$ of the glass core layer 102 may be greater than or equal to about $60 \times 10^{-7}/°$ C. in a range from 20° C. to 300° C. In yet other embodiments, the average core $CTE_C$ of the glass-ceramic composition of the glass core layer may be greater than or equal to about $80 \times 10^{-7}/°$ C. averaged over a range from 20° C. to 300° C. In yet other embodiments, the average core $CTE_C$ of the glass-ceramic composition of the glass core layer may be greater than or equal to about $90 \times 10^{-7}/°$ C. averaged over a range from 20° C. to 300° C.

In the embodiments described herein, the CTE differential between the glass core layer 102 and the glass clad layers 104a, 104b (i.e., $|CTE_C - CTE_{CL}|$) after heat treatment of the laminated glass article 100 as described herein is sufficient to generate a compressive stress in the glass clad layers. In some embodiments the CTE differential between the glass core layer and the glass clad layers is greater than or equal to about $20 \times 10^{-7}/°$ C. or even $30 \times 10^{-7}/°$ C. In some other embodiments, the CTE differential between the glass core layer and the glass clad layers is greater than or equal to about $40 \times 10^{-7}/°$ C. or even $50 \times 10^{-7}/°$ C. In yet other embodiments, the CTE differential between the glass core layer and the glass clad layers is greater than or equal to about $60 \times 10^{-7}/°$ C. or even $65 \times 10^{-7}/°$ C.

In the embodiments described herein the glass core layer may be formed from the exemplary glass core compositions listed in Table 1 below. However, it should be understood that other glass core compositions are contemplated and possible.

TABLE 1

Exemplary Glass Core Compositions

| | Core Example 1 | | Core Example 2 | |
|---|---|---|---|---|
| | mol % | wt % | mol % | wt % |
| $SiO_2$ | 69.2 | 65.9 | 65 | 59 |
| $Al_2O_3$ | 8.5 | 13.7 | 11.5 | 17.8 |
| $Na_2O$ | 13.9 | 13.7 | 13.5 | 12.7 |
| $K_2O$ | 1.2 | 1.7 | 3.5 | 5 |
| MgO | 6.5 | 4.2 | 5.5 | 3.3 |
| CaO | 0.5 | 0.5 | 0.5 | 0.4 |
| BaO | 0 | 0 | 0.5 | 1.2 |
| $SnO_2$ | 0.2 | 0.4 | 0.2 | 0.5 |

A variety of processes may be used to produce the laminated glass articles described herein including, without limitation, lamination slot draw processes, lamination float processes, or fusion lamination processes. Each of these lamination processes generally involves flowing a first molten glass composition, flowing a second molten glass-ceramic composition, and contacting the first molten glass composition with the second molten glass-ceramic composition at a temperature greater than the glass transition temperature of either composition to form an interface between the two compositions such that the compositions fuse together at the interface as the glass cools and solidifies.

Figure 2:
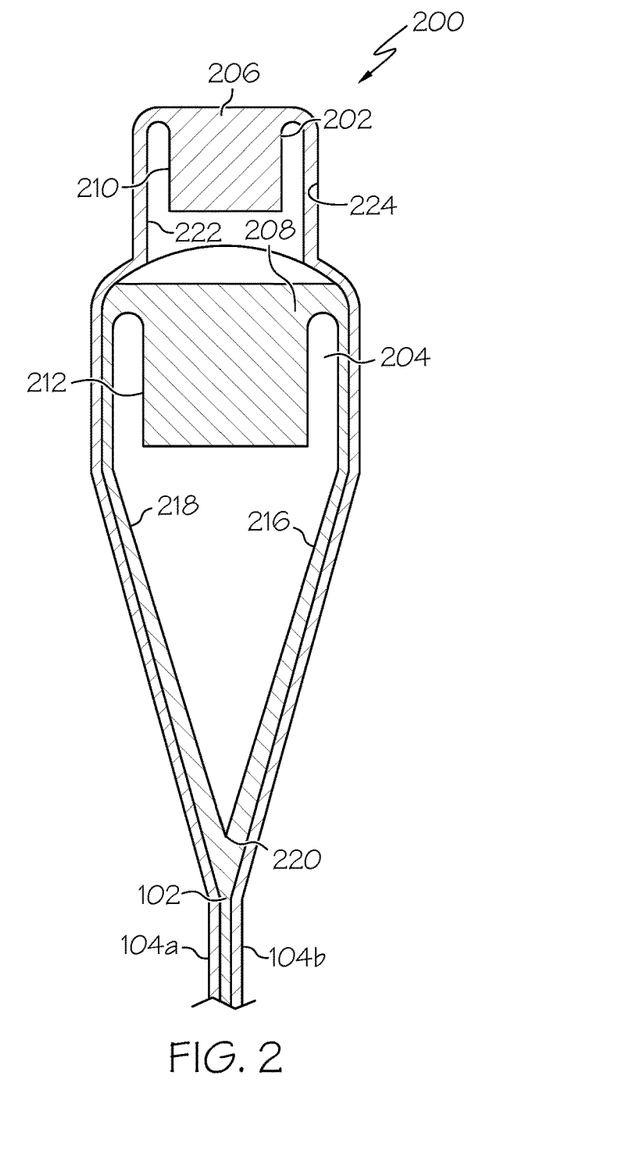
FIG. 2 schematically depicts an apparatus for forming a laminated glass article according to one or more embodiments shown and described herein.

In one particular embodiment, the laminated glass articles 100 described herein may be formed by a fusion lamination process such as the process described in U.S. Pat. No. 4,214,886, which is incorporated herein by reference. Referring to FIG. 2 by way of example, a laminate fusion draw apparatus 200 for forming a laminated glass article includes an upper overflow distributor or isopipe 202 which is positioned over a lower overflow distributor or isopipe 204. The upper overflow distributor 202 includes a trough 210 into which a molten glass-ceramic clad composition 206 (such as the glass-ceramic composition described herein) is fed from a melter (not shown). Similarly, the lower overflow distributor 204 includes a trough 212 into which a molten glass core composition 208 is fed from a melter (not shown).

As the molten glass core composition 208 fills the trough 212, it overflows the trough 212 and flows over the outer forming surfaces 216, 218 of the lower overflow distributor 204. The outer forming surfaces 216, 218 of the lower overflow distributor 204 converge at a root 220. Accordingly, the molten glass core composition 208 flowing over the outer forming surfaces 216, 218 rejoins at the root 220 of the lower overflow distributor 204 thereby forming a glass core layer 102 of a laminated glass article.

Simultaneously, the molten glass-ceramic clad composition 206 overflows the trough 210 formed in the upper overflow distributor 202 and flows over outer forming surfaces 222, 224 of the upper overflow distributor 202. The molten glass-ceramic clad composition 206 is outwardly deflected by the upper overflow distributor 202 such that the molten glass-ceramic clad composition 206 flows around the lower overflow distributor 204 and contacts the molten glass core composition 208 flowing over the outer forming surfaces 216, 218 of the lower overflow distributor 204, fusing to the molten glass core composition and forming glass clad layers 104a, 104b around the glass core layer 102.

While FIG. 2 schematically depicts a particular apparatus for forming planar laminated glass articles such as sheets or ribbons, it should be appreciated that other geometrical configurations are possible. For example, cylindrical laminated glass articles may be formed, for example, using the apparatuses and methods described in U.S. Pat. No. 4,023,953.

In the embodiments described herein, the molten glass core composition 208 generally has an average core coefficient of thermal expansion $CTE_C$ which is similar to the average clad coefficient of thermal expansion $CTE_{CL}$ of the molten glass-ceramic clad composition 206. In this embodiment, after the glass core layer 102 and the glass clad layers 104a, 104b cool and solidify, the resulting laminated glass article may undergo further processing, such as by heat treatment or the like, in order to ceram at least the glass clad layers 104a, 104b which, in turn, changes (i.e., lowers) the CTE of the glass clad layers and results in compressive stress being formed in the glass clad layers 104a, 104b of the laminated glass article. For example, when the glass clad layers 104a, 104b are formed from a glass-ceramic composition as described herein, heat treating the resultant laminated glass article as described herein lowers the coefficient of thermal expansion $CTE_{CL}$ of the glass clad layers 104a, 104b to $CTE_{AC}$, thereby decreasing the clad coefficient of thermal expansion $CTE_{CL}$ relative to the glass core layer 102. The resulting difference in the coefficient of thermal expansion causes compressive stress to develop in the glass clad layers 104a, 104b.

EXAMPLES

The embodiments described herein will be further clarified by the following examples.

In order to determine the effect of both composition and heat treatment schedules on the pre-ceramming $CTE_{PC}$ and post-ceramming $CTE_{AC}$, a series of glass samples were made having the compositions listed in Table 2 below. Samples of each composition were initially measured with 3D digital image correlation to determine the coefficient of thermal expansion. 3D digital image correlation is an optical stereo-imaging method that employs tracking and image registration techniques for 3D measurements of changes in images. The technique utilizes a non-contact full field displacement sensor, and relies on viewing 3D displacement of a random pattern on a specimen surface relative to an initial pattern. The random pattern is prepared by airbrushing a high temperature paint speckle pattern on the sample surface. The field of view (FOV) is described by a facet field in which the facets are squares that fill the field. The squares are tens of pixels across in dimension. Images of the sample are taken before and during elevated temperature exposure and are then compared to determine the thermal expansion behavior. As shown in Table 1, the pre-ceramming $CTE_{PC}$ values of the samples were between about $66 \times 10^{-7}/°$ C. to about $72 \times 10^{-7}/°$ C.

Thereafter, samples of each glass composition listed in Table 2 were cerammed according to the different heat treatment schedules identified in Table 2 and the post-ceramming $CTE_{AC}$ values were measured for the samples. Specifically, the $CTE_{AC}$ data in Table 2 is presented according to the heat treatment schedule the sample was subjected to which is presented using the convention (A° C., B H) and (Y ° C., Z H), where A is the nucleation temperature, B is the nucleation hold time, Y is the crystallization temperature, and Z is the crystallization hold time. Accordingly, a heat treatment of (700° C., 2 H) (750° C., 24 H) corresponds to a nucleation temperature of 700° C. and a nucleation hold time of 2 hours and a crystallization temperature of 750° C. and a crystallization hold time of 24 hours.

TABLE 2

Exemplary Glass-Ceramic Compositions

| | Mol. % (Wt. %) | | | | | | |
|---|---|---|---|---|---|---|---|
| | Ex. A | Ex. B | Ex. C | Ex. D | Ex. E | Ex. F | Ex. G |
| $SiO_2$ | 73.77 (67.78) | 73.07 (67.78) | 72.35 (67.12) | 72.36 (67.46) | 72.36 (67.8) | 72.37 (68.15) | 72 (67.06) |
| $Li_2O$ | 5.54 (2.59) | 5.62 (2.59) | 5.55 (2.56) | 5.54 (2.57) | 5.56 (2.59) | 5.55 (2.6) | 5.53 (2.56) |
| $Na_2O$ | 4.8 (4.78) | 5 (4.78) | 5.94 (5.68) | 6.93 (6.66) | 7.9 (7.64) | 8.9 (8.64) | 7.87 (7.56) |
| $K_2O$ | 2.69 (4.37) | 3.01 (4.37) | 2.98 (4.33) | 1.98 (2.9) | 0.99 (1.46) | 0 (0) | 0.99 (1.44) |
| $TiO_2$ | 2.38 (2.96) | 2.4 (2.96) | 2.38 (2.94) | 2.38 (2.95) | 2.38 (2.97) | 2.38 (2.98) | 2.37 (2.93) |
| $ZrO_2$ | 0.78 (1.52) | 0.8 (1.52) | 0.79 (1.51) | 0.8 (1.52) | 0.79 (1.52) | 0.79 (1.53) | 0.79 (1.51) |
| $SnO_2$ | 0.1 (0.23) | 0.1 (0.23) | 0.1 (0.23) | 0.1 (0.23) | 0.1 (0.23) | 0.1 (0.23) | 0.1 (0.23) |
| $Al_2O_3$ | 10 (15.76) | 10.01 (15.76) | 9.91 (15.6) | 9.91 (15.68) | 9.91 (15.76) | 9.91 (15.84) | 9.86 (15.59) |
| $P_2O_5$ | 0 (0) | 0 (0) | 0 (0) | 0 (0) | 0 (0) | 0 (0) | 0.5 (1.09) |
| Liquidus Viscosity (P) | 172,696 | | | | | | |
| $CTE_{PC}$ ($\times 10^{-7}/°C$) | 68.9 | 67.2 | 71.9 | 71 | 70.2 | 66.9 | 70.3 |
| $CTE_{AC}$ ($\times 10^{-7}/°C$) (700° C., 2 H) (750° C., 24 H) | | 57.7 | | | 37.5 | 27.7 | 19.1 |
| $CTE_{AC}$ ($\times 10^{-7}/°C$) (750° C., 2 H) (800° C., 24 H) | | 53.2 | 45.8 | 36.2 | 37.5 | 25.4 | 41.1 |
| $CTE_{AC}$ ($\times 10^{-7}/°C$) (750° C., 2 H) (825° C., 12 H) | | 53.2 | 69.6 | 40.3 | 35.6 | 27.4 | 35.4 |
| $CTE_{AC}$ ($\times 10^{-7}/°C$) (750° C., 2 H) (850° C., 12 H) | | 53.4 | | 46.7 | 38.7 | 30.1 | 40.5 |
| $CTE_{AC}$ ($\times 10^{-7}/°C$) (750° C., 2 H) (850° C., 16 H) | | 52.2 | | 49.1 | 39.3 | 30.5 | 40.6 |
| $CTE_{AC}$ ($\times 10^{-7}/°C$) (750° C., 2 H) (900° C., 2 H) | | 55.7 | | | | 34.9 | |
| $CTE_{AC}$ ($\times 10^{-7}/°C$) (750° C., 2 H) (900° C., 4 H) | | 55 | | | | 31.2 | |
| $Al_2O_3/(RO + R_2O)$ | 0.8 (1.3) | 0.7 (1.3) | 0.7 (1.2) | 0.5 (1.3) | 0.5 (1.3) | 0.7 (1.4) | 0.5 (1.3) |
| $SiO_2/Al_2O_3$ | 7 (4) | 7 (4) | 10 (4) | 10 (4) | 10 (4) | 7 (4) | 10 (4) |
| $(Li_2O + 2*SiO_2)/Al_2O_3$ | 15 (9) | 15 (11) | 22 (11) | 22 (11) | 22 (11) | 15 (11) | 22 (11) |
| $(R_2O + 2*SiO_2)/Al_2O_3$ | 16 (9) | 16 (9) | 23 (9) | 23 (9) | 23 (9) | 16 (9) | 23 (9) |
| $(SiO_2 + Al_2O_3 + Li_2O + K_2O + Na_2O)/(TiO_2 + ZrO_2 + P_2O_5)$ | 31 (21) | 30 (21) | 30 (21) | 30 (21) | 30 (21) | 31 (21) | 26 (17) |

As shown in Table 2, heat treatment of the glass-ceramic samples generally lowered the coefficient of thermal expansion of each sample relative to the pre-ceramming $CTE_{PC}$. The post-ceramming $CTE_{AC}$ is dependent on the type, quantity, and distribution of crystalline phases in the glass-ceramic samples. In the glass-ceramic samples of Examples A-G, the primary crystalline phase present after heat treatment was $Li_2Si_2O_5$ with a secondary phase of rutile ($TiO_2$). The quantity of both crystalline phases was dependent on the time and temperature of the treatment conditions as well as the glass-ceramic composition. In particular, it was determined that greater concentrations of $Na_2O$ relative to the concentration of $K_2O$ resulted in the nucleation and crystallization of more of the $Li_2Si_2O_5$ phase which, in turn, provided a more pronounced decrease in the post-ceramming $CTE_{AC}$.

In addition, it was also observed that for two samples formed from the same glass-ceramic composition and heat treated at a given nucleation temperature and nucleation hold time and thereafter heat treated at the same crystallization temperature but for different crystallization hold times, the sample heat treated for the longer crystallization hold time actually had fewer (albeit larger) ceramic crystals after crystallization than the sample heat treated for the shorter crystallization hold time, despite both samples having approximately the same number of nucleants after the initial nucleation phase of the heat treatment.

It should now be understood that the glass-ceramic compositions described herein have a post-ceramming $CTE_{AC}$ that is less than the pre-ceramming $CTE_{PC}$ and, as such, the glass-ceramic compositions are well suited for use as glass clad layers of strengthened laminated glass articles.

When the glass-ceramic compositions are used to produce laminated glass articles, the laminated glass articles can be used for a variety of applications including, for example, for cover glass or glass backplane applications in consumer or commercial electronic devices including, for example, LCD, LED, OLED, and quantum dot displays, computer monitors, and automated teller machines (ATMs); for touch screen or touch sensor applications, for portable electronic devices including, for example, mobile telephones, personal media players, and tablet computers; for integrated circuit applications including, for example, semiconductor wafers; for photovoltaic applications; for architectural glass applications; for automotive or vehicular glass applications; for commercial or household appliance applications; for lighting or signage (e.g., static or dynamic signage) applications; or for transportation applications including, for example, rail and aerospace applications.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A laminated glass article comprising:
a glass core layer having a core coefficient of thermal expansion $CTE_C$;
at least one glass clad layer directly fused to the glass core layer, the at least one glass clad layer comprising:
from about 60 mol. % to about 75 mol. % $SiO_2$;
from about 5 mol. % to about 10 mol. % $Al_2O_3$;
from about 2 mol. % to about 20 mol. % alkali oxide $R_2O$, the alkali oxide $R_2O$ comprising $Li_2O$ and $Na_2O$;
from 0 mol. % to about 5 mol. % alkaline earth oxide RO, the alkaline earth oxide RO comprising MgO, wherein a ratio of $Al_2O_3$ (mol. %)/($R_2O$ (mol. %)+RO (mol. %)) is less than 1;
a nucleating agent selected from the group consisting of $TiO_2$, $ZrO_2$, $P_2O_5$, and combinations thereof;
wherein a major crystalline phase of the at least one glass clad layer is $Li_2Si_2O_5$;
wherein the at least one glass clad layer has a clad coefficient of thermal expansion $CTE_{CL}$ that is greater than or equal to $20 \times 10^{-7}/°$ C. and less than or equal to about $70 \times 10^{-7}/°$ C. and less than the core coefficient of thermal expansion $CTE_C$; and
wherein a difference between the core coefficient of thermal expansion $CTE_C$ and the clad coefficient of thermal expansion $CTE_{CL}$ is greater than or equal to $20 \times 10^{-7}/°$ C.

2. The laminated glass article of claim 1, wherein the alkali oxide $R_2O$ comprises from about 1 mol. % to about 10 mol. % $Na_2O$.

3. The laminated glass article of claim 1, wherein a ratio of ($SiO_2$ (mol. %)+$Al_2O_3$ (mol. %)+$Li_2O$ (mol. %)+$K_2O$ (mol. %)+$Na_2O$ (mol. %))/($TiO_2$ (mol. %)+$P_2O_5$ (mol. %)+$ZrO_2$ (mol. %)) is greater than 26.

4. The laminated glass article of claim 3, wherein the at least one glass clad layer further comprises from about 1 mol. % to about 4 mol. % $TiO_2$.

5. The laminated glass article of claim 1, wherein the alkali oxide $R_2O$ comprises from about 1 mol. % to about 10 mol. % $Li_2O$.

6. The laminated glass article of claim 1, wherein the at least one glass clad layer comprises MgO from greater than 0 mol. % and less than or equal to about 5 mol. %.

7. The laminated glass article of claim 1, wherein a ratio of $SiO_2$ (mol. %) to $Al_2O_3$ (mol. %) is from 7 to 10.

8. The laminated glass article of claim 1, wherein a ratio of ($Li_2O$ (mol. %)+2*$SiO_2$ (mol. %))/$Al_2O_3$ (mol. %) is from 13 to 22.

9. The laminated glass article of claim 1, wherein a ratio of ($SiO_2$ (mol. %)+$Al_2O_3$ (mol. %)+$Li_2O$ (mol. %)+$K_2O$ (mol. %)+$Na_2O$ (mol. %))/($TiO_2$ (mol. %)+$P_2O_5$ (mol. %)+$ZrO_2$ (mol. %)) is from 26 to 31.

10. The laminated glass article of claim 1, wherein the difference between the core coefficient of thermal expansion $CTE_C$ and the clad coefficient of thermal expansion $CTE_{CL}$ is greater than or equal to $30 \times 10^{-7}/°$ C.

11. The laminated glass article of claim 1, wherein the core coefficient of thermal expansion $CTE_C$ is greater than or equal to about $60 \times 10^{-7}/°$ C. in a range from 20° C. to 300° C.

12. A method comprising:
fusing a glass core layer having a core coefficient of thermal expansion $CTE_C$ to at least one glass clad layer having a pre-ceramming coefficient of thermal expansion $CTE_{PC}$ within about 20% of $CTE_C$ to form a laminated glass article, the at least one glass clad layer comprising:
from about 60 mol. % to about 75 mol. % $SiO_2$;
from about 5 mol. % to about 10 mol. % $Al_2O_3$;
from about 2 mol. % to about 20 mol. % alkali oxide $R_2O$, the alkali oxide $R_2O$ comprising $Li_2O$ and $Na_2O$; and
from 0 mol. % to about 5 mol. % alkaline earth oxide RO, the alkaline earth oxide RO comprising MgO, wherein a ratio of $Al_2O_3$ (mol. %)/($R_2O$ (mol. %)+RO (mol. %)) is less than 1;
a nucleating agent selected from the group consisting of $TiO_2$, $ZrO_2$, $P_2O_5$, and combinations thereof; and
heat treating the laminated glass article to ceram the at least one glass clad layer, thereby reducing the coefficient of thermal expansion of the glass clad layer to a post-ceramming coefficient of thermal expansion $CTE_{AC}$ that is greater than or equal to $20 \times 10^{-7}/°$ C. and less than or equal to about $70 \times 10^{-7}/°$ C. and less than the core coefficient of thermal expansion $CTE_C$, wherein a difference between the core coefficient of thermal expansion $CTE_C$ and the clad coefficient of thermal expansion $CTE_{CL}$ is greater than or equal to $20 \times 10^{-7}/°$ C., a major crystalline phase of the at least one glass clad layer being $Li_2Si_2O_5$.

13. The method of claim 12, wherein the pre-ceramming $CTE_{PC}$ is greater than or equal to about $65 \times 10^{-7}/°$ C. and less than or equal to about $110 \times 10^{-7}/°$ C.

14. The method of claim 12, wherein the alkali oxide $R_2O$ comprises from about 1 mol. % to about 10 mol. % $Na_2O$.

15. The method of claim 12, wherein a ratio of ($SiO_2$ (mol. %)+$Al_2O_3$ (mol. %)+$Li_2O$ (mol. %)+$K_2O$ (mol. %)+$Na_2O$ (mol. %))/($TiO_2$ (mol. %)+$P_2O_5$ (mol. %)+$ZrO_2$ (mol. %)) is greater than 26.

16. The method of claim 15, wherein the at least one glass clad layer further comprises from about 1 mol. % to about 4 mol. % $TiO_2$.

17. The method of claim 12, wherein the alkali oxide $R_2O$ comprises from about 1 mol. % to about 10 mol. % $Li_2O$.

* * * * *

UNITED STATES PATENT AND TRADEMARK OFFICE
CERTIFICATE OF CORRECTION

PATENT NO. : 11,597,676 B2
APPLICATION NO. : 16/929319
DATED : March 7, 2023
INVENTOR(S) : Heather Debra Boek et al.

It is certified that error appears in the above-identified patent and that said Letters Patent is hereby corrected as shown below:

In the Claims

In Column 16, Line 16, in Claim 11, delete "$10^{-7}/°$ C." and insert -- $10^{-7}/°$ C. --.

In Column 16, Lines 41-42, in Claim 12, delete "$10{-7}/°$ C." and insert -- $10^{-7}/°$ C. --.

Signed and Sealed this
Twenty-second Day of October, 2024

Katherine Kelly Vidal
*Director of the United States Patent and Trademark Office*